US005177358A

United States Patent [19]

Roberts et al.

[11] Patent Number: 5,177,358

[45] Date of Patent: Jan. 5, 1993

[54] SOLID STRIPPER FOR A SPACE BASED NEUTRAL PARTICLE BEAM SYSTEM

[75] Inventors: Thomas G. Roberts; Larry J. Havard, Jr., both of Huntsville; Edward L. Wilkinson, New Hope, all of Ala.

[73] Assignee: The United States of America as represented by the Secretary of the Army, Washington, D.C.

[21] Appl. No.: 397,371

[22] Filed: Jun. 30, 1982

[51] Int. Cl.[5] .......... H01S 1/00

[52] U.S. Cl. .......... 250/251; 376/129; 376/130; 89/1.11

[58] Field of Search .......... 376/130, 129; 250/251; 89/1 A, 1.11; 313/231.01; 315/111.01

[56] References Cited

U.S. PATENT DOCUMENTS 2,816,243 12/1957 Herb et al. .......... 315/111.01

3,395,302 7/1968 Brown, Jr. et al. .......... 313/231.01

3,790,787 2/1974 Geller .......... 250/251

4,140,576 2/1979 Fink et al. .......... 250/251

4,284,952 8/1981 Fink .......... 250/251

OTHER PUBLICATIONS

Scientific American, Apr. 1979, vol. 240, No. 4, "Particle-Beam Weapons", pp. 54-65, Parmentola et al.

Physics Today, Aug. 1983, pp. 17-20.

*Primary Examiner*—Harvey E. Behrend

*Attorney, Agent, or Firm*—Freddie M. Bush; James T. Deaton

[57] ABSTRACT

A solid state stripper for stripping $H^-$ to $H^O$ is provided that includes a very thin solid state material such as polyvinylidene chloride, mica, and cellophane that is moved at a predetermined speed in front of an accelerated beam of negative ions to cause the negative ions to be stripped to form neutral ions as they pass through the solid state stripper material.

5 Claims, 2 Drawing Sheets

FRACTIONS OF AN $H^-$ BEAM SURVIVING AS $H^-$ IS STRIPPED TO $H^0$ OR $H^+$ AS A FUNCTION OF STRIPPER THICKNESS

SOLID STRIPPER FOR A SPACE BASED NEUTRAL PARTICLE BEAM SYSTEM

DEDICATORY CLAUSE

The invention described herein may be manufactured, used, and licensed by or for the Goverment for governmental purposes without the payment to us to any royalties thereon.

BACKGROUND OF THE INVENTION

Concepts for the use of high energy particle beams for military applications have been in existence for more than two decades. During this period, extensive theoretical and experimental effort have been performed, and many workers have contributed to the development and evaluation of these efforts. Both ground based and space based systems have been studied and both are currently under development for some applications.

One space based system that is currently being developed utilizes neutral particle beams. Contrasted to charged particle beams, neutral particle beams have several inherent properties that make them very attractive for space based applications. In particular, high energy neutral particles propagate in straight lines unaffected by the earth's magnetic field and have a very brief flight time to targets even at extended ranges. In addition, the neutral particles become high energy charged particles upon interaction with the surface of a target and penetrate deeply into the vehicle, thus making shielding relatively ineffective. In the case of a nuclear warhead, these particles are capable of heating the nuclear material by fission processes, neutron generation and ionization. For non-nuclear material, heating is produced by ionization, possibly producing kill by thermal initation of the weapon's high explosive. Thus, interest in space based systems was revitalized when experiments, at the Los Alamos Clinton P. Anderson Meson Physics Facility (LAMPF), on the proton linear accelerator showed several orders of magnitude improvement in accelerator performance. Extensive measurements of beam properties at energies of 211 and 500 MeV showed that the energy spread of the beam was better than 0.5% and the emittance of the beam was better than 0.66$\pi$cm-mrad. In addition, the LAMPF accelerator has been used to accelerate $H^-$ ions to energies above 100 MeV and, as expected, their behavior is similar to that of protons. These achievements prompted Knapp and NcNally to write a LASL report titled SIPAPU Rpt. LA-5642-MS, Los Alamos Scientific Laboratory, July 1974, in which they proposed a satellite-based high energy neutral hydrogen weapon. Their device is depicted schematically in FIG. 1. An intense, high quality beam of $H^-$ ions is generated and accelerated to an energy of approximately 250 MeV. After acceleration the beam is expanded, and passed through final focusing and steering magnets. The beam is subsequently neutralized by stripping the weakly bound electron from the $H^-$ ion and the resulting hydrogen beam propagates toward the target unaffected by the earth's magnetic fields. Both the system and the target must remain above approximately 250 kilometers in order to minimize the beam degradation by collisions with residual gases.

Improvements in the state of the art for producing intense high quality ion beams, for lightweight efficient accelerators, for high current negative ion beams stripper techniques without excessive scattering, and for compact lightweight power systems are necessary before this device can be considered viable. Methods for neutral beam detection, signatures for closed loop tracking and kill assessment, and techniques for rapidly steering the beam over large angles are also needed.

Although, there are many of these practicle issues to be considered, there does not appear, in principle, to be any inherent limitations that deem the device inviable. And, many of these practicle issues have been or are being overcome. But the current solutions for the neutralization of the $H^-$ ion beams all have serious adverse systems implications.

Once the $H^-$ beam has been accelerated, aimed, and focused on the target it can be neutralized. This can be accomplished by a number of techniques. For example, photo detachment, a plasma or gas stripping have been considered. Photo detachment causes less degradation in beam quality and can result in the largest friction of the ion beam being converted to a neutral beam. Unfortunately, extremely high energy cw lasers at wavelengths that are not currently available are required for this purpose, and, even if they become available, they would probably be as large and as expensive as the rest of the system. Since open-ended plasma strippers with quiescent plasmas cause less beam degradation than a gas stripper they have also been considered; but, because of the necessity of allowing the plasma to escape, the power requirement for the plasma stripper alone in equal to or greater than that for the rest of the system. Also, it is problematical that a sufficiently quiescent plasma could be produced. Therefore, considerable work both theoretical and experimental has been devoted to the development of a gas stripper. The important results of this work is summarized in FIG. 2 where the fractions of the initial beam which survives as $H^-$, which is stripped to $H^o$, and which is stripped to $H^+$ is given as a function of the stripper thickness.

As a result of this work a gas stripper is now included in the SIPAPU system. However, this is also an open system where the gas escapes out the ends. Part of this gas expands back into the $H^-$ beam optical system where stripping collisions occur before the beam has been made parallel and these particles are therefore not directed toward the target. The rest of this gas escapes out in the forward direction where additional stripping collisions occur producing $H^+$ particles which do not reach the target because of the effect of the earth's magnetic field. As can be seen, there is a need for a better and more efficient way to strip $H^-$ ion beams to $H^o$ ion beams.

Therefore, it is an object of this invention to provide a neutralization device that overcomes many adverse effects on the system in which this device is to be used.

Another object of this invention is to replace the low pressure gas stripper with a solid stripper that is made of very thin material.

A still further object of this invention is to replace the low pressure gas stripper with a solid stripper that is made of a material such as saran wrap, mica, cellophane, or the like.

Other objects and advantages of this invention will be obvious to those skilled in this art.

SUMMARY OF THE INVENTION

In accordance with this invention, a solid state stripper for stripping $H^-$ ion beams to $H^o$ ion beams is provided by providing a very thin material in which it is rolled from one reel to another reel and the $H^-$ ion beam is passed therethrough as the very thin solid state stripper is being wound from one reel to the other. As the $H^-$ ion beams strike the thin material, the loose electrons of the $H^-$ ion beams are knocked loose and the ion beam emerges on the opposite side of the solid state stripper as $H^o$ ion beam.

DESCRIPTION OF THE PREFERRED EMBODIMENT

Applicants have discovered through their work with gas strippers for stripping $H^-$ ion to $H^o$ ion that the stripping effeciency and the resulting scattering of the ions is independent of the target material used to strip the $H^-$ ion when the stripper thickness is measured in gm/cm. With this discovery, applicants have been able to replace low pressure gas strippers with a solid state stripper when the solid is made thin enough. For a space based system of the type referred to in the background of this invention where high quality beam of $H^-$ ions is generated and accelerated to an energy of approximately 250 MeV, a solid state material of a thickness of about $0.05\times10^{-3}$ inches works well. Such solid state materials can be selected from materials such as polyvinylidene cloride (saran wrap), mica, cellophane, and other similar materials.

Figure 3:
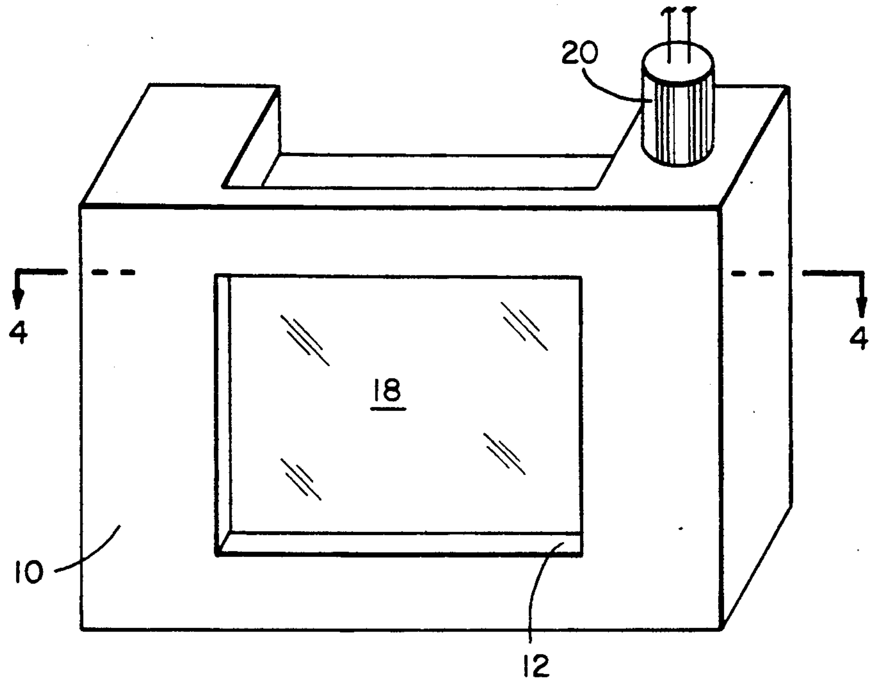
FIG. 3 is a perspective view of the solid state stripper in accordance with this invention.
Figure 4:
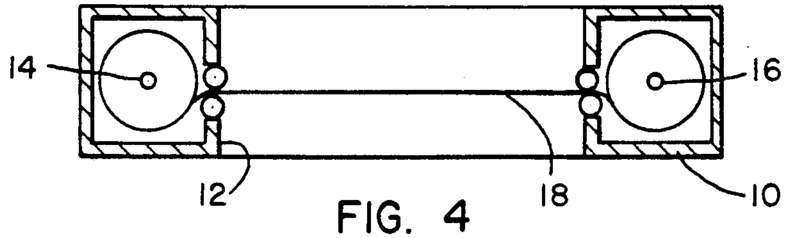
FIG. 4 is a sectional view taken along line 4—4 of FIG. 3.
Figure 5:
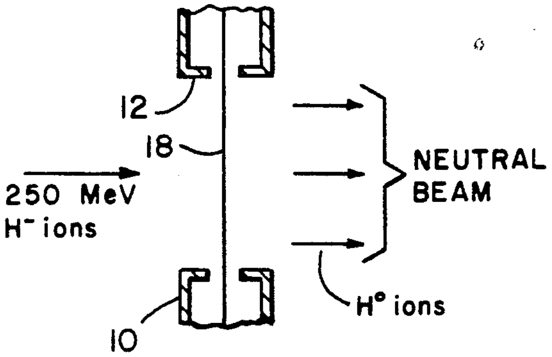
FIG. 5 is a schematic sectional view illustrating passing of H$^-$ ion through solid state stripper to produce neutral beam.

Referring now to FIG. 3, the solid stripper includes a housing 10 which has a window opening 12 therethrough that is approximately 2 meters square. Inside housing 10, (see FIG. 4) reels 14 and 16 are mounted in a conventional manner with solid state stripper material 18 wound thereon. Reel 16 is a take-up reel and is motor driven by motor 20 (see FIG. 3) to move solid state material 18 passed window 12 as the ion beam is passed through solid state material 18 as illustrated in FIG. 5. Provisions are also made for discharging any charge on solid state material 18 by providing a conventional ground for discharging any charge on the solid state material as it is taken up on take-up reel 16.

Figure 2:
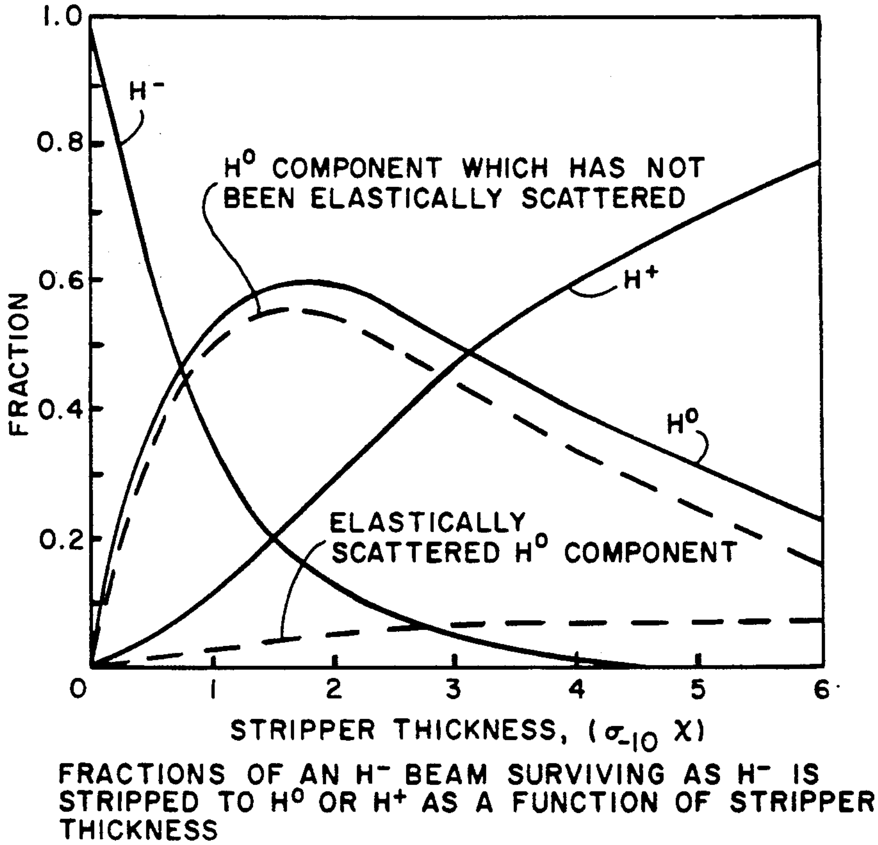
FIG. 2 is a graph illustrating summarized work relative to stripper development.
Figure 1:
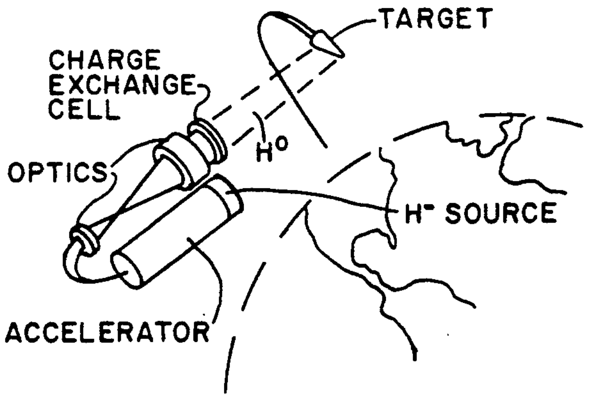
FIG. 1 is a schematic illustration of a space based neutral particle beam system.

In operation, when the high energy $H^-$ beam is turned on so is motor drive 20 which moves solid state stripper material 18 passed window 12 at a linear speed of about 2 meters/sec. When the high energy $H^-$ beam is turned off, so is motor 20 for take-up reel 16. In this way, as illustrated in FIG. 5, $H^-$ ions accelerated at 250 MeV strike solid state stripper material 18 and emerge on the other side as $H^o$ ions in the form of a neutral beam for propagation to the target. Approximately 40 to 50 percent of the negative ions become useful neutral particles as illustrated in FIG. 2.

As can be seen, the solid state stripper material is held in a large holder containing two reels which are much like camera reels with one of the reels being a take-up reel that is motor driven so that a new and fresh surface of solid state stripper material is presented to the beam every few seconds. As can be seen, this solid state stripper is simple, requires negligible power and has no adverse systems effects.

We claim:

1. In a system for use in outer space and for producing a beam of accelerated neutral particles, means for providing a beam of accelerated $H^-$ negative ions and for expanding said beam of said $H^-$ negative ions, means for neutralizing said accelerated and expanded beam of $H^-$ negative ions, said neutralizing means comprising a solid state film stripper material in front of the accelerated and expanded beam of said $H^-$ negative ions, and means for moving said solid state film stripper material at a substantially constant rate as the accelerated and expanded beam of said $H^-$ negative ions pass therethrough to cause the $H^-$ negative ions to be stripped to $H^o$ particles.

2. A system as defined in claim 1, wherein said means mounting said solid state film stripper material and said means for moving said solid state film stripper material includes a housing having a window therein with a pair of reels mounted in said housing and a motor connected to one of said reels with said solid state film stripper material mounted on said heels so that when said motor is turned on, said solid state film stripper material is caused to be reeled off one of said reels and taken up on the other of said reels.

3. A system as defined in claim 2, wherein said solid state film stripper material is a thin plastic material of about $0.05\times10^{-3}$ inches thick and said $H^-$ negative ions to be stripped have been accelerated to approximately 250 MeV.

4. A system as defined in claim 3, wherein said solid state film stripper material is selected from polyvinylidene chloride, and cellophane.

5. A system as defined in claim 1, wherein said solid state film stripper material is selected from polyvinylidene chloride, mica, and cellophane, and wherein said solid state film stripper material has a thickness of about $0.05\times10^{-3}$ inches.

* * * * *